US 6,735,738 B1

(12) United States Patent
Kojima (10) Patent No.: US 6,735,738 B1
(45) Date of Patent: May 11, 2004

(54) METHOD AND DEVICE FOR RECONSTRUCTING ACOUSTIC DATA AND ANIMATION DATA IN SYNCHRONIZATION

(75) Inventor: Hideki Kojima, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,226

(22) Filed: Oct. 20, 1999

(30) Foreign Application Priority Data

Nov. 4, 1998 (JP) .......................................... 10-313203

(51) Int. Cl.⁷ ................................................ G09G 5/12
(52) U.S. Cl. ..................... 715/500.1; 345/12; 704/503
(58) Field of Search ...................... 715/500.1; 348/512; 704/211, 500, 503; 345/12

(56) References Cited

U.S. PATENT DOCUMENTS

| | | | | |
|---|---|---|---|---|
| 5,523,769 A | * | 6/1996 | Lauer et al. .................. | 345/1.3 |
| 5,751,280 A | * | 5/1998 | Abbott et al. ............ | 707/200.1 |
| 5,808,722 A | * | 9/1998 | Suzuki ......................... | 352/12 |
| 5,815,143 A | * | 9/1998 | Jenney et al. ............... | 345/563 |
| 5,959,684 A | * | 9/1999 | Tan et al. .................... | 348/515 |
| 6,130,987 A | * | 10/2000 | Tanaka ........................ | 386/96 |
| 6,246,985 B1 | * | 6/2001 | Kanevsky et al. .......... | 704/270 |
| 6,269,119 B1 | * | 7/2001 | Ueda ...................... | 375/240.01 |
| 6,285,825 B1 | * | 9/2001 | Miwa et al. .................. | 386/98 |
| 6,349,286 B2 | * | 2/2002 | Shaffer et al. .............. | 704/503 |
| 6,546,190 B1 | * | 4/2003 | Phillips et al. ................ | 386/65 |

FOREIGN PATENT DOCUMENTS

JP          5-3561          1/1993

OTHER PUBLICATIONS

Nilesh V. Patel et al., "Audio Characterization for Viedo Indexing", IS\&T SPIE Proceedings: Storage and Retrieval for Image and Video Databases IV, Feb. 1996, downloaded on May 8, 2003 from http://www.cs.wayne.edu/~sethi/spie–1996.ps.*

Christoph Bregler et al., "Video Rewrite: Driving Visual Speech with Audio", Acm SIGGRAPH 1997, downloaded on May 8, 2003 from http://graphics.stanford.edu/~bregler/videorewrite/VideoRewrite.pdf.*

MacroMind, Inc., MacroMind MediaMaker User's Guide (1990), Chapter 7.*

* cited by examiner

Primary Examiner—Sanjiv Shah
Assistant Examiner—Maikhanh Nguyen
(74) Attorney, Agent, or Firm—Staas & Halsey LLP (57) ABSTRACT

A pair of acoustic data and animation data that are in synchronization are compressed or expanded, and reconstructed in synchronization in the following manner. The acoustic data and the animation data are divided into a plurality of segments. A parameter time series that determines the degree of compression or expansion of the acoustic data and the animation data is determined for each divided segment. The divided acoustic data is further divided at equal intervals into input frames. An output frame length is determined based on the determined parameter time series. A correspondence table for synchronous points between the acoustic data before compression or expansion and the acoustic data after compression or expansion with respect to the acoustic data to be compressed or expanded is output based on the determined parameter time series. The acoustic data is compressed or expanded based on the correspondence table. The animation data is compressed or expanded based on the correspondence table.

7 Claims, 7 Drawing Sheets

| Before compressing or expanding | | After compressing or expanding | |
|---|---|---|---|
| Sec.No. | Time stamp | Sec.No. | Time stamp |
| 1 | 1:15 | 1 | 1:30 |
| 2 | 0:40 | 2 | 0:20 |
| 3 | 2:30 | 3 | 2:50 |
| ... | ... | ... | ... |
| n | | n | |

METHOD AND DEVICE FOR RECONSTRUCTING ACOUSTIC DATA AND ANIMATION DATA IN SYNCHRONIZATION

BACKGROUND OF THE INVENTION

1. Field of the Invention

The present invention relates to a technique for compressing or expanding data for sounds combined with animation while synchronizing the sounds and the animation so as to reproduce the data.

2. Description of the Prior Art

With recent rapid development of computer processing techniques regarding sounds and animation, multimedia equipment handling sounds and animation such as digital video has been spread rapidly. In particular, in the field of story-oriented animated cartoons that handle sounds and animation at the same time, computer processing is widely used for the edition or other purposes, and a highly advanced technique is in demand for the edition function for sounds and animation. For example, in the case where video data is to be created by combining animation data representing motions of a character with speech data that has been edited separately, it is important to produce natural video images by synchronizing the two data. Herein, "video images" refers to multimedia information including sounds and animation, and includes animated cartoons and video images having a story that are created by actual shooting.

Furthermore, in the case where a portion of the video data that is completed as one scenario is desired to be used in another piece of work, it may be necessary to compress or expand the video data to be used. In this case, it is important to compress or expand the data so that the synchronization of the acoustic data and the animation data is not destroyed.

However, in conventional video data, the speech data and the animation data are generated in time series with respect to a character independently in many cases, and they may differ in the recording time length. Therefore, it is necessary to compress or expand one of the data or both of the data and to synchronize the two data.

In the case where the video data are compressed or expanded, various methods are used to retain the synchronization of the acoustic data and the animation data. For example, Japanese Laid-Open Patent Publication (Tokkai-Hei) No. 5-3561 discloses a method for editing or reproducing a story including speech and animation, in which the speech data and the animation data are edited separately, and then reconstructed in synchronization to create one story.

However, in such a method, since the speech data and the animation data are compressed or expanded separately and then synchronized later, it is not guaranteed that the content of the speech and the animation are precisely in synchronization except at the start point and the end point of the synchronization. Since particularly definite video images tend to be required nowadays, a fine adjustment, for example, to reproduce a speech that agrees with the motion of the mouth of the character, is required. Nevertheless, there are many problematic cases, for example, where the speech does not agree with the motion of the mouth of the character, or where the speech is output when the mouth of the character is not moving.

SUMMARY OF THE INVENTION

Therefore, with the foregoing in mind, it is an object of the present invention to provide a simple method for precise synchronous processing, and method and device for reconstructing acoustic data and animation data in synchronization that can reproduce natural video images, in the case where video data including the acoustic data and the animation data that are in synchronization are compressed or expanded.

A device for reconstructing acoustic data and animation data in synchronization of the present invention for compressing or expanding a pair of acoustic data and animation data that are in synchronization includes a data segment dividing part for dividing a series of acoustic data and a series of animation data into a plurality of segments; a parameter time series instructing part for instructing a parameter time series that determines a degree of compression or expansion of the acoustic data and the animation data of each of the segments divided by the data segment dividing part; an input frame dividing part for further dividing the acoustic data divided by the data segment dividing part at equal intervals into input frames; an output frame length determining part for determining an output frame length of the acoustic data based on the parameter time series determined by the parameter time series instructing part; an acoustic animation synchronous data output part for outputting a correspondence table for synchronous points between the acoustic data before compression or expansion and the acoustic data after compression or expansion with respect to the acoustic data to be compressed or expanded based on the parameter time series determined by the parameter time series instructing part; an acoustic data reconstructing part for compressing or expanding the acoustic data based on the output frame length; and an animation data reconstructing part for compressing or expanding the animation data based on the correspondence table.

In this embodiment, the data previously is divided into segments at every point where synchronization is required. Therefore, when the acoustic data alone is compressed or expanded, the animation data accordingly can be compressed or expanded in synchronization with the acoustic data. Thus, the video data can be compressed or expanded simply and reliably.

In the device for reconstructing animation data and acoustic data in synchronization of the present invention, it is preferable that the parameter time series is extracted based on only the acoustic data in the parameter time series instructing part, because the scene with sounds is often an important scene that requires synchronization in the video images, such a scene where the character is speaking.

Furthermore, in the device for reconstructing animation data and acoustic data in synchronization of the present invention, it is preferable that the parameter time series is extracted based on only the animation data in the parameter time series instructing part. The synchronous point can be extracted easily based on the change in the motion of the character.

Furthermore, in the device for reconstructing animation data and acoustic data in synchronization of the present invention, it is preferable that the parameter time series is extracted based on both of the acoustic data and the animation data in the parameter time series instructing part. The weighting of both of the data combined allows synchronous points to be set more precisely.

Furthermore, in the device for reconstructing animation data and acoustic data in synchronization of the present invention, it is preferable that the parameter time series is input manually by a user in the parameter time series instructing part. This embodiment allows fine adjustment to minimize the sense of incongruity that a viewer feels.

Next, a method for reconstructing acoustic data and animation data in synchronization of the present invention for compressing or expanding a pair of acoustic data and animation data that are in synchronization includes dividing the acoustic data and the animation data into a plurality of segments; instructing a parameter time series that determines a degree of compression or expansion of the acoustic data and the animation data of each divided segment; further dividing the divided acoustic data at equal intervals into input frames; determining an output frame length based on the determined parameter time series; outputting a correspondence table for synchronous points between the acoustic data before compression or expansion and the acoustic data after compression or expansion with respect to the acoustic data to be compressed or expanded based on the determined parameter time series; compressing or expanding the acoustic data based on the correspondence table; and compressing or expanding the animation data based on the correspondence table.

In this embodiment, the data previously is divided into segments at every point where synchronization is required. Therefore, when the acoustic data alone is compressed or expanded, the animation data accordingly can be compressed or expanded in synchronization with the acoustic data. Thus, the video data can be compressed or expanded simply and reliably.

In the method for reconstructing animation data and acoustic data in synchronization of the present invention, it is preferable that the parameter time series is extracted based on only the acoustic data in the step of instructing the parameter time series, because the scene with sounds is often an important scene that requires synchronization in the video images, such a scene where the character is speaking.

Furthermore, in the method for reconstructing animation data and acoustic data in synchronization of the present invention, it is preferable that the parameter time series is extracted based on only the animation data in the step of instructing the parameter time series. The synchronous point can be extracted easily based on the change in the motion of the character.

Furthermore, in the method for reconstructing animation data and acoustic data in synchronization of the present invention, it is preferable that the parameter time series is extracted based on both of the acoustic data and the animation data in the step of instructing the parameter time series. The weighting of both of the data combined allows synchronous points to be set more precisely.

Furthermore, in the method for reconstructing animation data and acoustic data in synchronization of the present invention, it is preferable that the parameter time series is input manually by a user in the step of instructing the parameter time series. This embodiment allows fine adjustment to minimize the sense of incongruity that a viewer feels.

Next, a computer-readable recording medium of the present invention stores a program to be executed by a computer for compressing or expanding a pair of acoustic data and animation data that are in synchronization. The program includes dividing the acoustic data and the animation data into a plurality of segments; instructing a parameter time series that determines the degree of compression or expansion of the acoustic data and the animation data of each divided segment; further dividing the divided acoustic data at equal intervals into input frames; determining an output frame length based on the determined parameter time series; outputting a correspondence table for synchronous points between the acoustic data before compression or expansion and the acoustic data after compression or expansion with respect to the acoustic data to be compressed or expanded based on the determined parameter time series; compressing or expanding the acoustic data based on the correspondence table; and compressing or expanding the animation data based on the correspondence table.

In this embodiment, when the program is loaded onto a computer and executed, the following device for reconstructing acoustic data and animation data in synchronization can be realized. The data previously is divided into segments at every point where synchronization is required. Therefore, when the acoustic data alone is compressed or expanded, the animation data accordingly can be compressed or expanded in synchronization with the acoustic data. Thus, the video data can be compressed or expanded simply and reliably.

These and other advantages of the present invention will become apparent to those skilled in the art upon reading and understanding the following detailed description with reference to the accompanying figures.

DESCRIPTION OF THE PREFERRED EMBODIMENTS

Figure 1:
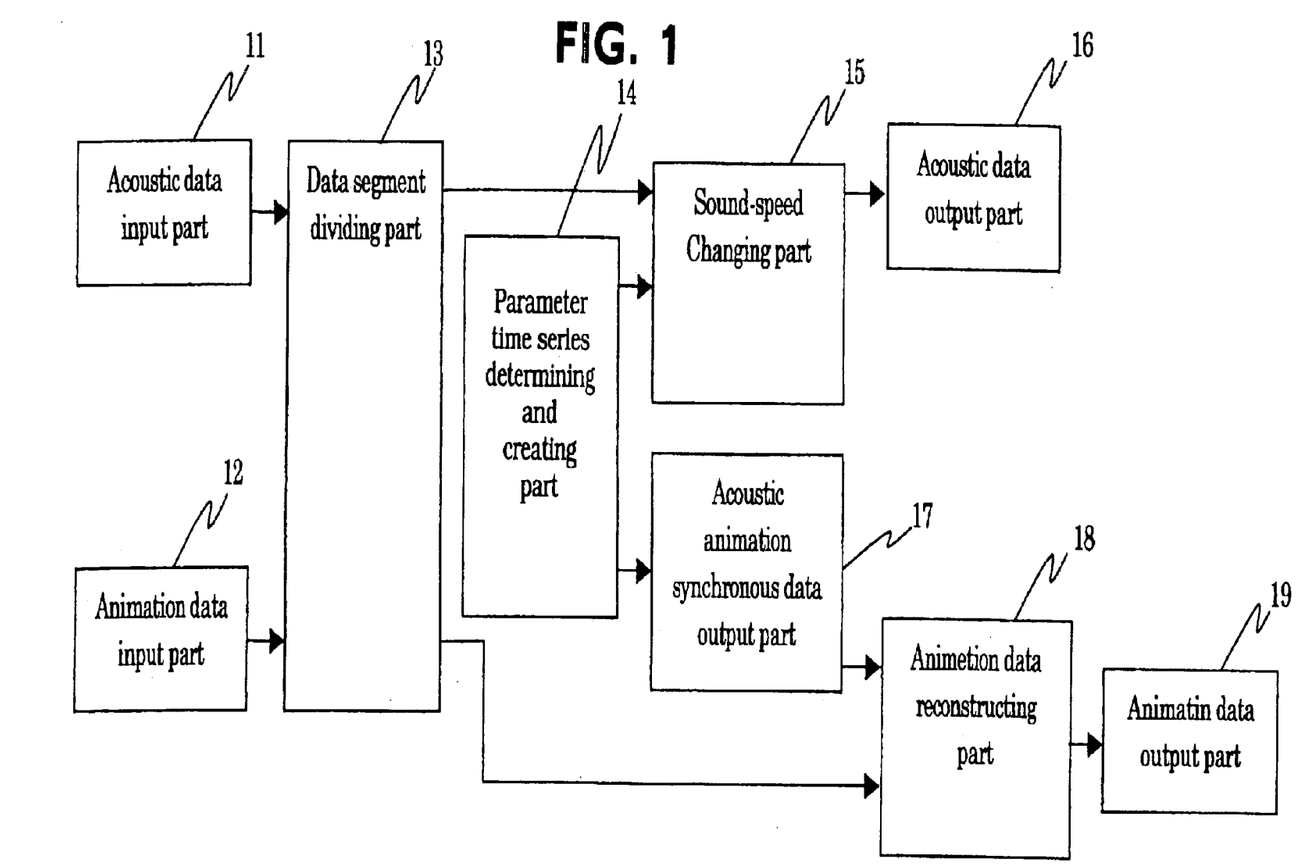
FIG. 1 is a diagram showing the principle of a device for reconstructing acoustic data and animation data in synchronization according to an embodiment of the present invention.

Hereinafter, a device for reconstructing animation data and acoustic data in synchronization of an embodiment of the present invention will be described with reference to the accompanying drawings. FIG. 1 is a schematic diagram of the structure of a device for reconstructing animation data and acoustic data in synchronization of an embodiment of the present invention.

Referring to FIG. 1, the device for reconstructing animation data and acoustic data in synchronization of the present invention includes an acoustic data input part 11, an animation data input part 12, a data segment dividing part 13, a parameter time series instructing part 14, a sound speed changing part 15, an acoustic data output part 16, an acoustic animation synchronous data output part 17, an animation data reconstructing part 18 and an animation data output part 19.

When video data for sounds combined with animation is supplied to the acoustic data input part 11 and the animation data input part 12, both of the acoustic data and the animation data are divided based on a certain standard in the data segment dividing part 13. Most simply, the data may be divided at equal intervals, but the method for the division is not limited thereto. The data can be divided by any other standards, for example, at the end of a scene in the video images, or at the appearance or the walk-out of a specific character.

The parameter time series instructing part 14 sets a parameter time series that determines how the acoustic data and the animation data are synchronized, by extracting the parameter time series from the supplied acoustic data and animation data, or by the user inputting the parameter time series.

Next, the sound speed changing part 15 changes the sound speed of each of the segments, which are divided by the data segment dividing part 13, based on the parameter time series set by the parameter time series instructing part 14. Then, acoustic animation synchronous data corresponding to the speed change thereof is output in the acoustic animation synchronous data output part 17.

Although the sound speed changing part 15 changes the sound speed, it does not change the height of the sound, namely does not change the pitch of the sound. Furthermore, the sound speed is not necessarily constant in the same segment, and the expansion or compression is possible in the same segment.

As the acoustic animation synchronous data, a correspondence table showing the correspondence between data at a time of the acoustic data changed with respect to the sound speed and the time of the data in the original acoustic data is output. With such a correspondence made clear, the animation data can be compressed or expanded in synchronization with the animation data corresponding to the time in the original acoustic data.

Then, the animation data reconstructing part 18 performs compression or expansion such as thinning out some animation frames or duplicating animation frames based on the correspondence table, so that the animation data in synchronization with the acoustic data are created.

The acoustic data is output as new acoustic data that has been changed in the sound speed changing part 15 from the acoustic data output part 16, and the animation data that has been reconstructed in the animation data reconstructing part 18 is output in synchronization with the new acoustic data.

Figure 2:
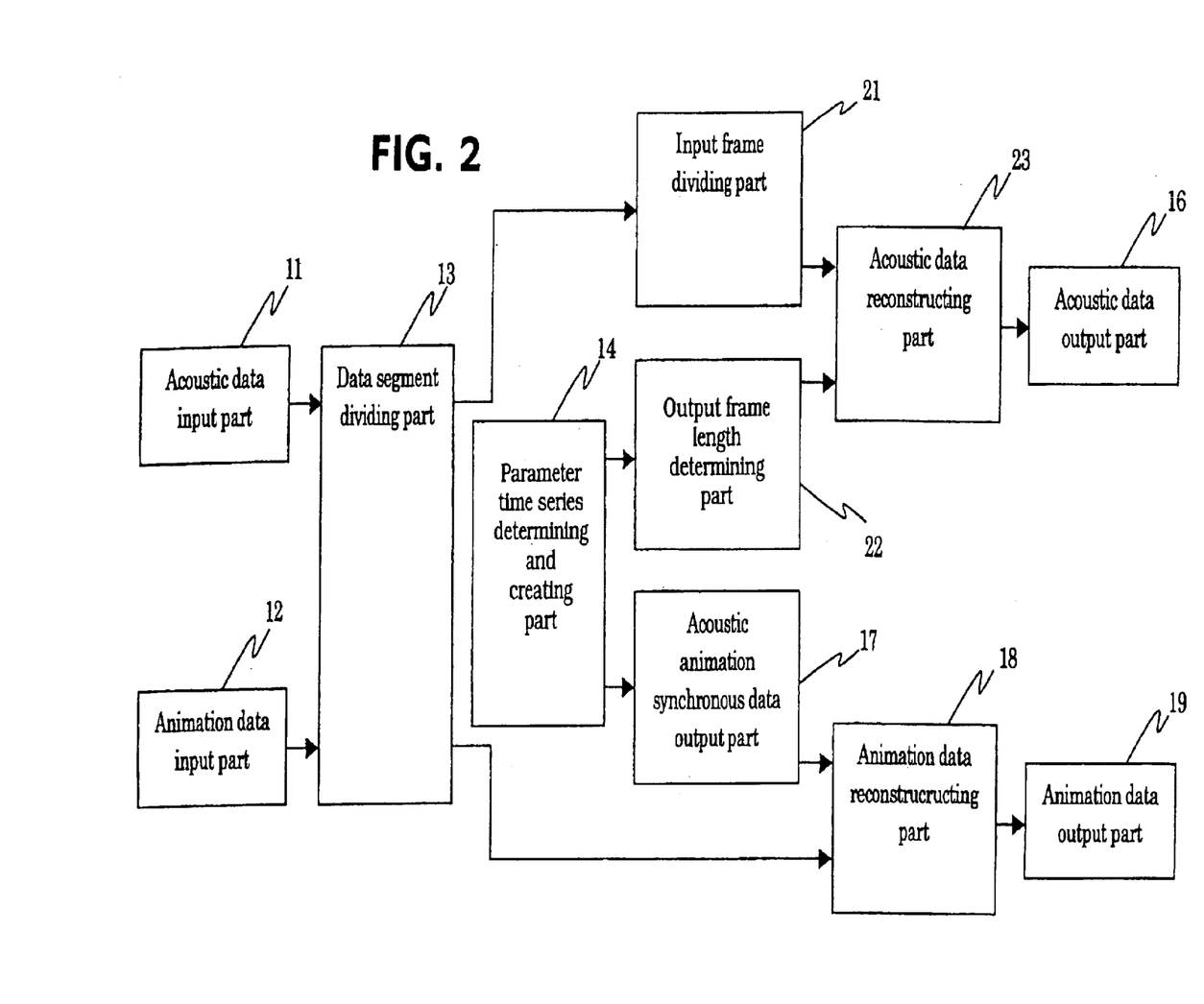
FIG. 2 is a schematic diagram of the structure of a device for reconstructing acoustic data and animation data in synchronization according to an embodiment of the present invention.

Next, FIG. 2 is an example of a device for reconstructing acoustic data and animation data in synchronization according to an embodiment of the present invention. In. FIG. 2, reference number 21 denotes an input frame length dividing part, reference numeral 22 denotes an output frame determining part, and reference numeral 23 denotes an acoustic data reconstructing part.

In FIG. 2, when video data for sounds combined with animation is supplied, both of the acoustic data and the animation data are divided based on a certain standard in the data segment dividing part 13. Most simply, the data may be divided at equal intervals, but the method for the division is not limited thereto. The data can be divided based on other standards, for example, at the end of a scene in the video images, or at the appearance or the walk-out of a specific character.

The segment division can be based on scene change points. More specifically, a scene change point is detected, and the data is divided into segments, each of which is from one scene change point to the next scene change point. "Scene change point" refers to a point at which continuity between animation frames is broken significantly. Hereinafter, a method for detecting the scene change point will be described by taking MPEG-1 data stream as an example. However, the animation data is not limited to the MPEG-1 data stream, and the method for detecting the scene change point is not limited to the method described below.

The MPEG-1 data stream is provided with GOP (group of pictures) layers including intra-frame coded frame (I-Picture), inter-frame coded frame (P-Picture), and frame-interpolation frame (B-Picture) in order to raise the compression efficiency. Each frame is compressed on a macroblock-by-macroblock basis, where the macroblock is 8×8.

There are various types of macroblocks, which include an intra-macroblock encoded by intra-coding (hereinafter, referred to as "I-MB"), a forward prediction macroblock for forward prediction (hereinafter, referred to as "P-MB"), a backward prediction macroblock for backward prediction (hereinafter, referred to as "B-MB"), and a bi-directional prediction macroblock for bi-directional prediction (hereinafter, referred to as "D-MB"). The total number of these four macroblocks in the frame is utilized for the detection of the scene change point.

Furthermore, an average value of motion vectors in the frame obtained from each of the prediction macroblocks is utilized as well. Herein, "motion vector" refers to a differential vector from one scene to another.

More specifically, when the scene change point is assumed to be a point at which continuity between frames is broken significantly, it can be estimated that it is difficult to obtain a motion vector in the frames before and after the scene change point. Therefore, it is believed to be inevitable that a rapid increase of I-MB and a rapid reduction of D-MB occur in the frames before and after the scene change point. Further, it can be estimated that P-MB increases and B-MB reduces in the frame immediately before the scene change point, and it can be estimated that P-MB reduces and B-MB increases in the frame immediately after the scene change point. The scene change points can be inferred by defining an evaluation function in view of these characteristics.

Next, the parameter time series instructing part 14 sets a parameter time series that determines how the acoustic data and the animation data are synchronized, by extracting the parameter time series based on the supplied acoustic data and animation data, or by the user inputting the parameter time series.

The extraction of the parameter time series can be performed in various methods. Herein, the extraction based on only the acoustic data, the extraction based on only the animation data and the extraction based on both of the acoustic data and the animation data will be described below.

First, the extraction of the parameter time series based on only the acoustic data can be performed using the level of the power of a sound. This method for determining the parameter time series is based on the view that important information is included in a segment where the sound level is high, and the information in a segment where the sound level is low is not important very much. This method is effective in the synchronization of the acoustic data and the animation data based on the words spoken by a character by setting the acoustic power of the speech of the character to be large in the video images. Similarly, the parameter time series can be extracted based on the pitch of the sound.

Furthermore, the parameter time series can be extracted based on the spectrum of a sound in order to specify the sound source. The spectrum of a sound includes FFT (fast fourier transform) spectrum, LPC (linear predictive coding) spectrum, or the like, but the present invention is not limited thereto, and any spectrum that can specify the type of the sound source can be used. This method can determine the parameter time series, for example, based on the standard that a segment where a leading character is speaking is regarded as important and that a segment where a supporting character is speaking is regarded as less important.

Next, the extraction of the parameter time series based on only the animation data can be performed using motion vectors (differential vectors). In this method, the scene change point is obtained by the degree of the change of the motion vectors, and the scene change intervals are arranged in time series, so as to determine the parameter time series.

Finally, the extraction of the parameter time series based on both of the acoustic data and the animation data can be performed in the following manner. The parameter time series obtained in the method of the extraction based on only the acoustic data and the method of the extraction based on only animation data are weighted so that an optimal parameter time series can be extracted. The weighting may be programmed beforehand or may be input by the user in view of the nature of the video data.

Figure 3:
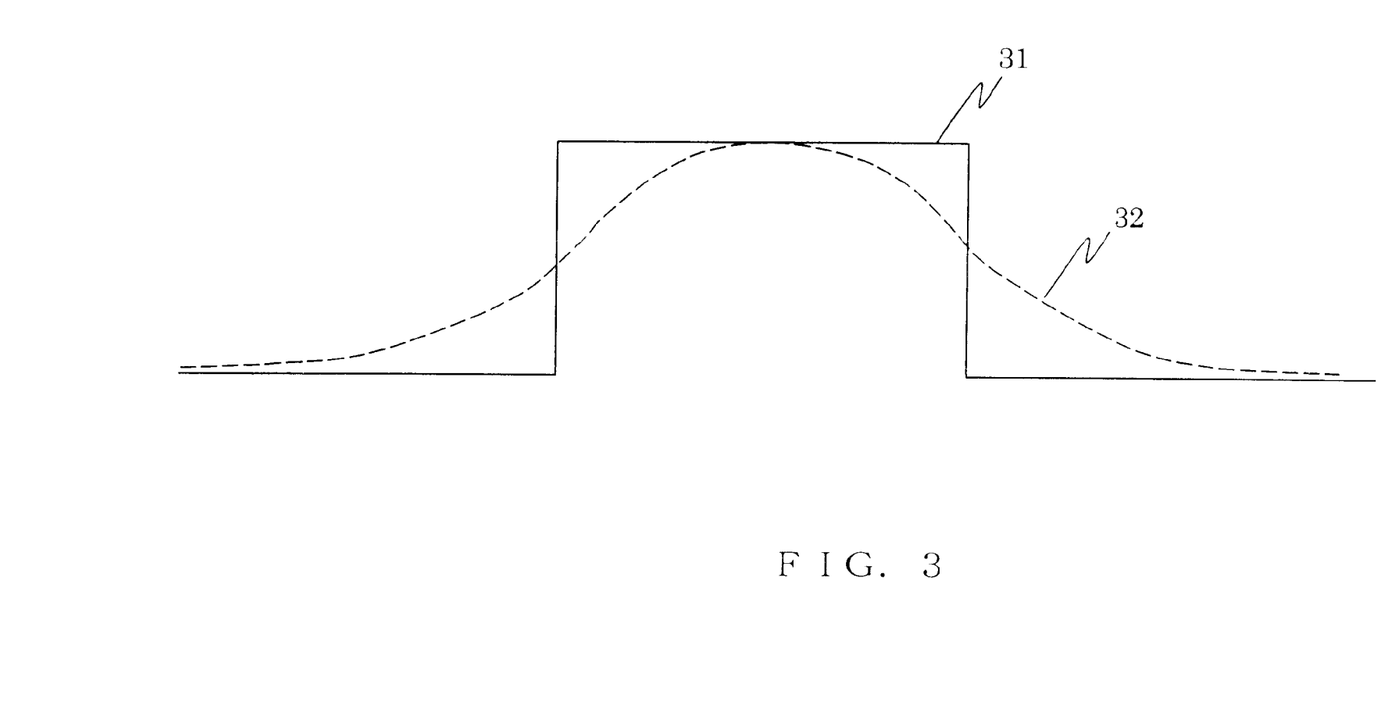
FIG. 3 is an illustrative diagram of smoothing of an step input.

Furthermore, the parameter time series can be input by the user through an input medium such as a keyboard. In this case, smoothing is performed so that the parameter time series is input as a step function. When the input step function 31 is changed to a frequency 32 with a smooth change, as shown in FIG. 3, effects of not creating any completely soundless area and smoothing the joint of the acoustic data can be expected.

Next, the input frame diving part 21 divides the acoustic data at equal intervals into input frames. The interval for an input frame is shorter than the data segment defined by the data segment dividing part 13.

The output frame length determining part 22 determines each output frame length based on the value of the parameter time series so that the sum of the output frame length is (the original data segment length)*(compression or expansion ratio) in each data segment. Most simply, the output frame length can be proportional to the parameter time series.

Figure 4:
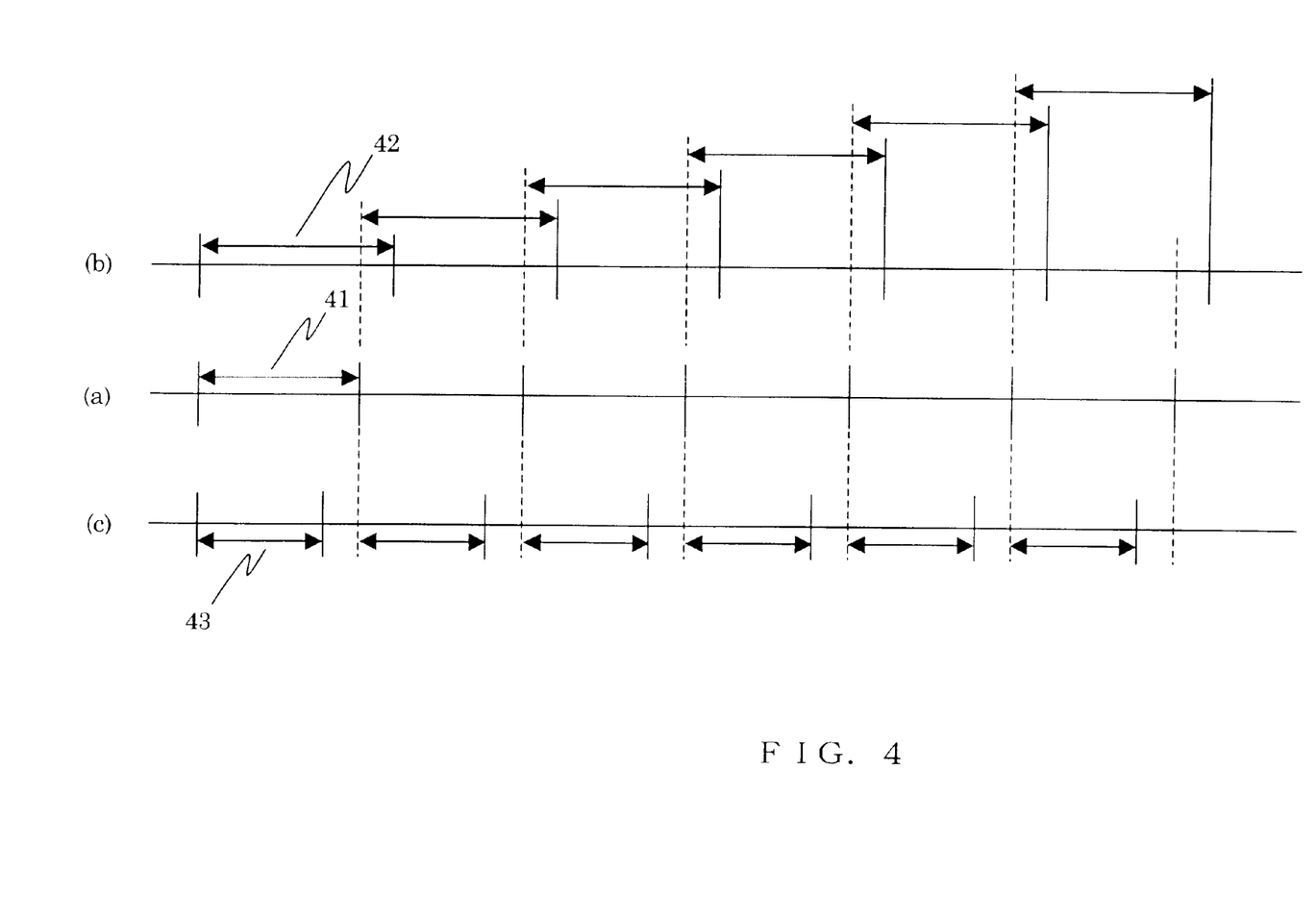
FIG. 4 is a diagram for illustrating a method for obtaining an output frame length.

FIG. 4 is a diagram showing a typical example of the method for obtaining the output frame length that is proportional to the parameter time series. In FIG. 4, reference numeral 41 denotes an input frame length of the acoustic data, reference numeral 42 denotes an output frame length when the acoustic data is reproduced slowly, and reference numeral 43 denotes an output frame length when the acoustic data is reproduced fast.

FIG. 4(*a*) shows the acoustic data divided equally into input frames by the input frame dividing part 21. In the case where the acoustic data is to be reproduced more slowly in proportion to the parameter time series, the output frame length 42 can be obtained by multiplying the equally divided frame length 41 by the proportional constant of the parameter time series, as shown in FIG. 4(*b*). Thus, each frame is expanded to the output frame length, and the animation data also is expanded to the obtained new output frame length. Thus, as long as the sound and the animation are synchronized in each frame before the expansion, the sound and the animation are in synchronization after the expansion.

Similarly, in the case where the acoustic data is to be reproduced faster in proportion to the parameter time series, the output frame length 43 can be obtained by multiplying the equally divided frame length 41 by the proportional constant of the parameter time series, as shown in FIG. 4(*c*). Thus, each frame is compressed to the output frame length, and the animation data also is compressed to the obtained new output frame length. Thus, as long as the sound and the animation are synchronized in each frame before the compression, the sound and the animation are in synchronization after the compression.

The acoustic data reconstructing part 23 cuts out the acoustic data with the output frame length from the input frame and connects them with displacement so that the joint can be smooth. The position where the joint can be smooth can be obtained in various methods, such as a method of obtaining a position where the cross-correlation is the strongest. However, the present invention is not limited thereto, and any method that allows sounds to be reproduced without discontinuity can be used.

The acoustic animation synchronous data output part 17 outputs a correspondence table showing the correspondence between data at a time of the acoustic data changed with respect to the sound speed and the time of the data in the original acoustic data. With such a correspondence made clear, the animation data can be compressed or expanded in synchronization with the animation data corresponding to the time in the original acoustic data.

Figure 5:
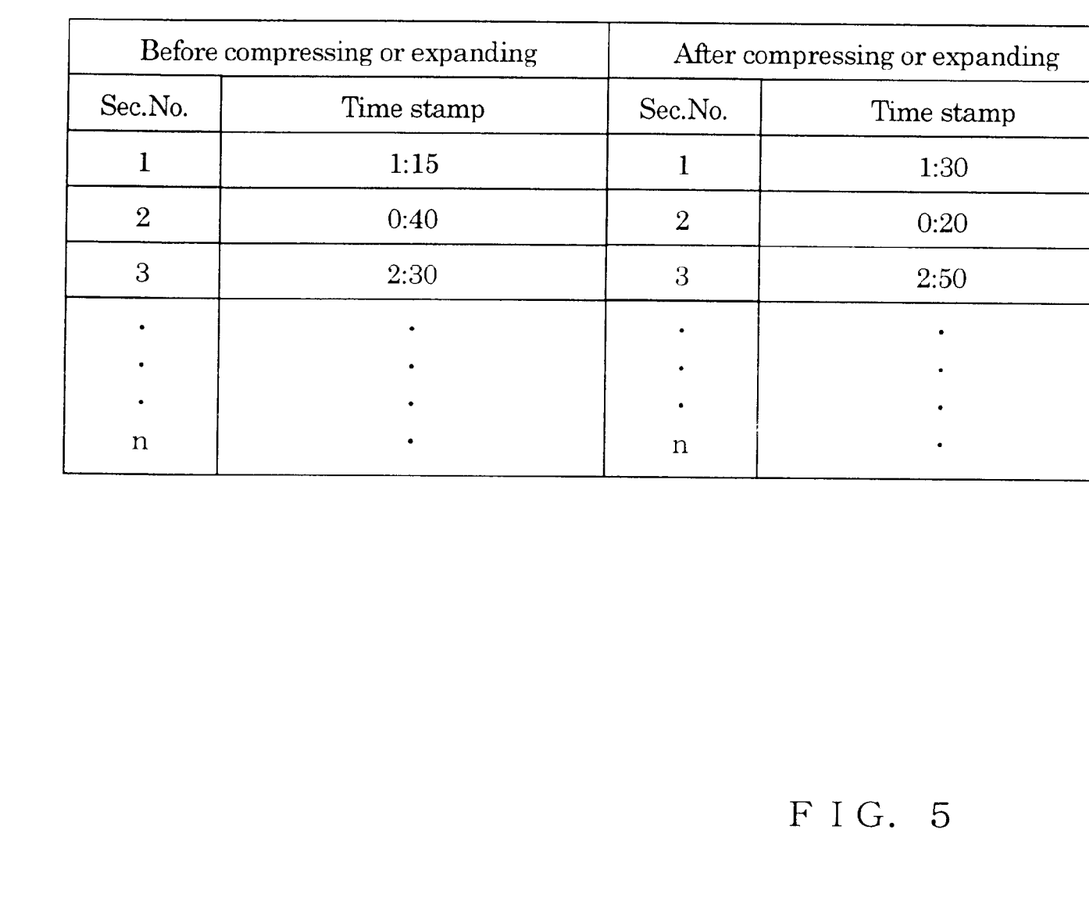
FIG. 5 is an illustrative diagram of a correspondence table, which is an acoustic animation synchronous data output.

FIG. 5 shows an example of the correspondence table, which is output as the acoustic animation synchronous data. In FIG. 5, the time stamp of the acoustic data before compression or expansion and the time stamp of the acoustic data after compression or expansion are recorded in the correspondence table. For example, in section "1", the acoustic data is expanded, and the segment end time stamp is 15 seconds later. Similarly, in section "2", the acoustic data is compressed, and the section end time stamp is 20 seconds earlier.

The animation data is compressed or expanded in accordance with an increase or decrease in the time stamp, so that the acoustic data and the animation data can be in synchronization for each segment. Thus, the time when the acoustic data and the animation data are required to be synchronized is used as the division point of the segments, so that it is possible to compress or expand video images in synchronization in a necessary time when the synchronization is required.

In other words, in the animation data reconstructing part 18, the animation data in synchronization with the acoustic data can be created by performing processing, such as thinning out some animation frames or duplicating some animation frames, based on the correspondence table.

The animation data can be expanded or compressed by other methods. For example, animation frames for a scene where the motion of a character is relatively slow are duplicated or deleted for adjustment. Alternatively, animation frames are duplicated or thinned out in a certain ratio. However, the present invention is not limited thereto.

As described above, the embodiment of the present invention allows acoustic data and animation data to be synchronized in a reliable and simple manner, even if precise synchronization is required, in the case where the video data including the acoustic data and the animation that are in synchronization is compressed or expanded. Thus, the embodiment of the present invention allows reproduction of video images that look natural to viewers.

Figure 6:
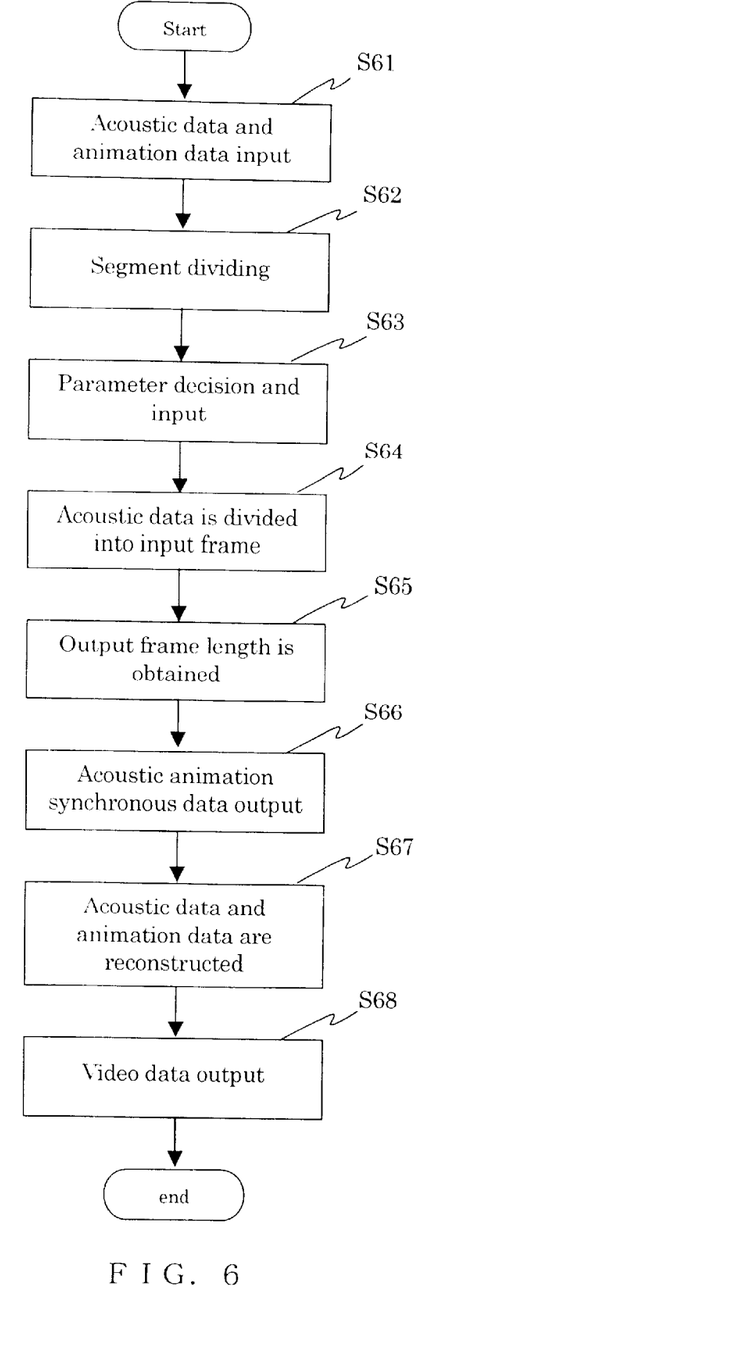
FIG. 6 is a flow chart of the process of a device for reconstructing acoustic data and animation data in synchronization according to an embodiment of the present invention.

Next, the flow of the process of a program realizing a device for reconstructing acoustic data and animation data in synchronization according to an embodiment of the present invention will be described below. FIG. 6 shows the flow chart of the process of the program realizing a device for reconstructing acoustic data and animation data in synchronization according to an embodiment of the present invention.

Referring to FIG. 6, acoustic data and animation data to be compressed or expanded are input (Step S61). Then, the input data is divided into segments based on a certain standard, for example, based on the scene change point (Step S62).

Then, a parameter time series is extracted based on the input acoustic data and the animation data, or the user inputs a parameter time series (Step S63).

After each segment of the segments into which the acoustic data is divided is divided at equal intervals into frames (Step S64), an output frame length with respect to each input frame is obtained based on the determined parameter time series (Step S65). In order to synchronize the acoustic data and the animation data in accordance with the output frame length, a correspondence table showing the correspondence between data at a time of the compressed or expanded acoustic data and the time of the data in the original acoustic data is output as an acoustic animation synchronous data output (Step S66).

Then, the acoustic data and the animation data are reconstructed based on the correspondence table (Step S67) so that video data including the acoustic data and the animation data is output (Step S68).

Figure 7:
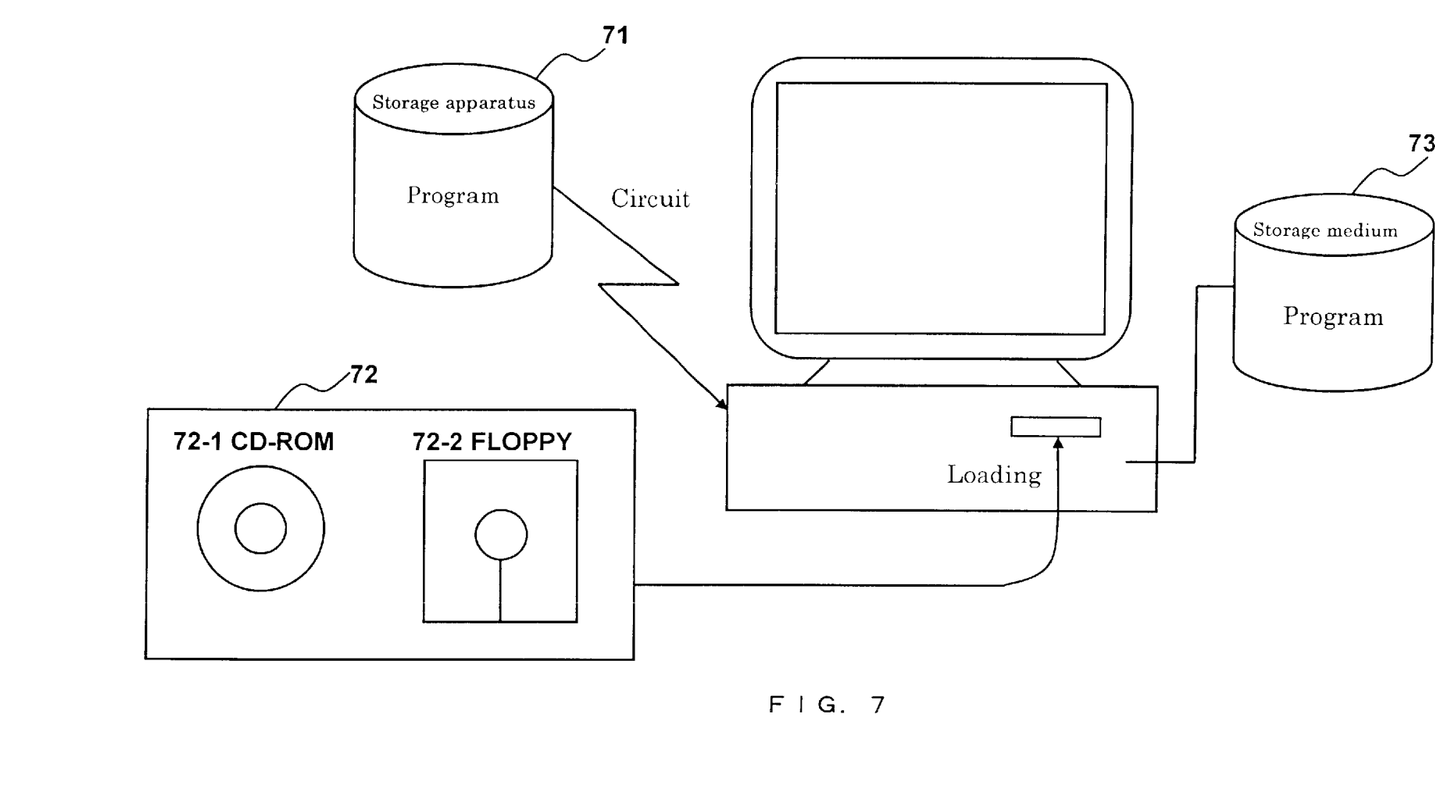
FIG. 7 is an illustrative diagram of a recording medium.

A recording medium in which programs for realizing the device for reconstructing acoustic data and animation data in synchronization according to the embodiment of the present invention are recorded can be not only a transportable recording medium 72 such as a CD-ROM 72-1, or a floppy disk 72-2, but also a remote accessible storage apparatus 71 or an equipped storage medium 73 such as a hard disk and a RAM of a computer, as shown in FIG. 7. The program 74 is loaded into the main memory of a data processing apparatus 73, and executed.

Furthermore, a recording medium in which acoustic animation synchronous data generated by the device for reconstructing acoustic data and animation data in synchronization according to the embodiment of the present invention are recorded can be not only a transportable recording medium 72 such as a CD-ROM 72-1, or a floppy disk 72-2, but also a remote accessible storage apparatus 71 or an equipped storage medium 73 such as a hard disk and a RAM of a computer, as shown in FIG. 7. For example, the acoustic animation synchronous data can be read by a computer to use the device for reconstructing acoustic data and animation data in synchronization of the present invention.

As described above, according to the device for reconstructing acoustic data and animation data in synchronization of the present invention, the data previously is divided into segments at every point where synchronization is required. Therefore, when the acoustic data alone is compressed or expanded, the animation data can be compressed or expanded in synchronization with the acoustic data. Thus, the video data can be compressed or expanded simply and reliably.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A device to reconstruct acoustic data and animation data in synchronization by compressing or expanding a pair of acoustic data and animation data that are in synchronization, comprising:

a data segment dividing part dividing a series of acoustic data and a series of animation data into a plurality of segments;

a parameter time series determining and creating part determining and creating at least one of a power of a sound extracted from the acoustic data, a parameter representing a pitch of the sound, spectrum data extracted from the acoustic data, and motion vectors extracted from the animation data, as a variable parameter time series that determines a degree of compression or expansion of the acoustic data and the animation data of each of the segments divided by the data segment dividing part;

an input frame dividing part to further divide the acoustic data segments into equal interval input frames;

an output frame length determining part determining an output frame length of the acoustic data based on the parameter time series determined by the parameter time series determining and creating part;

an acoustic animation synchronous data output part outputting a correspondence table for synchronous points between the acoustic data before compression or expansion and the acoustic data after compression or expansion with respect to the acoustic data to be compressed or expanded based on the parameter time series determined by the parameter time series determining and creating part;

an acoustic data reconstructing part compressing or expanding the acoustic data of the input frames based on the output frame length; and an animation data reconstructing part compressing or expanding the animation data based on the correspondence table.

2. The device to reconstruct animation data and acoustic data in synchronization according to claim 1, wherein the parameter time series is input manually by a user in the parameter time series instructing part.

3. A method of reconstructing acoustic data and animation data in synchronization by compressing or expanding a pair of acoustic data and animation data that are in synchronization, the method comprising:

dividing the acoustic data and the animation data into a plurality of segments;

determining and creating at least one of a power of a sound extracted from the acoustic data, a parameter representing a pitch of the sound, spectrum data extracted from the acoustic data, and motion vectors extracted from the animation data, as a variable parameter time series that determines a degree of compression or expansion of the acoustic data and the animation data of each divided segment;

further dividing the divided acoustic data segments into equal interval-input frames;

determining an output frame length of the acoustic data based on the determined variable parameter time series;

outputting a correspondence table for synchronous points between the acoustic data before compression or expansion and the acoustic data after compression or expansion with respect to the acoustic data to be compressed or expanded based on the determined parameter time series;

compressing or expanding the acoustic data of the input frames based on the output frame length; and compressing or expanding the animation data based on the correspondence table.

4. The method of reconstructing animation data and acoustic data in synchronization according to claim 3, wherein the parameter time series is input manually by a user in the operation of instructing the parameter time series.

5. A computer-readable recording media storing a program, to be executed on a computer, to reconstruct acoustic data and animation data in synchronization by compressing or expanding a pair of acoustic data and animation data that are in synchronization, the program comprising:

dividing the acoustic data and the animation data into a plurality of segments;

determining and creating at least one of a power of a sound extracted from the acoustic data, a parameter representing a pitch of the sound, spectrum data extracted from the acoustic data, and motion vectors extracted from the animation data, as a variable parameter time series that determines a degree of compression or expansion of the acoustic data and the animation data of each divided segment;

further dividing the divided acoustic data segments at equal intervals into input frames;

determining an output frame length of the acoustic data based on the determined variable parameter time series;

outputting a correspondence table for synchronous points between the acoustic data before compression or expansion and the acoustic data after compression or expansion with respect to the acoustic data to be compressed or expanded based on the determined parameter time series;

compressing or expanding the acoustic data of the input frames based on the output frame length; and compressing or expanding the animation data based on the correspondence table.

6. A device to reconstruct acoustic data and animation data in synchronization by compressing or expanding a pair of acoustic data and animation data that are in synchronization, comprising:

a data segment dividing part to divide a series of acoustic data and a series of animation data into a plurality of segments;

a parameter time series determining and creating part determining a variable parameter time series that determines a degree of compression or expansion of the acoustic data and the animation data of each of the segments divided by the data segment dividing part;

an input frame dividing part dividing the acoustic data segments at equal intervals into input frames;

an output frame length determining part determining an output frame length of the acoustic data based on the parameter time series determined by the variable parameter time series determining and creating part;

an acoustic animation synchronous data output part outputting a correspondence table for synchronous points between the acoustic data before compression or expansion and the acoustic data after compression or expansion with respect to the acoustic data to be compressed or expanded based on the parameter time series determined by the parameter time series determining and creating part;

reconstructing means for compressing or expanding the acoustic data of the input frames and animation data based on the output frame length and correspondence table, respectively.

7. A method of reconstructing acoustic data and animation data in synchronization by compressing or expanding a pair of acoustic data and animation data that are in synchronization, the method comprising:

dividing the acoustic data and the animation data into a plurality of segments;

determining and creating at least one of a power of a sound extracted from the acoustic data, a parameter representing a pitch of the sound, spectrum data extracted from the acoustic data, and motion vectors extracted from the animation data, as a variable parameter time series that determines a degree of compression or expansion of the acoustic data and the animation data of each divided segment;

further dividing the acoustic data segments at equal intervals into input frames;

determining an output frame length of the acoustic data based on the determined variable parameter time series;

outputting a correspondence table for synchronous points between the acoustic data before compression or expansion and the acoustic data after compression or expansion with respect to the acoustic data to be compressed or expanded based on the determined parameter time series;

compressing or expanding the acoustic data of the input frames and the animation data based on the output frame length and the correspondence table, respectively.

* * * * *

UNITED STATES PATENT AND TRADEMARK OFFICE
CERTIFICATE OF CORRECTION

PATENT NO. : 6,735,738 B1
DATED : May 11, 2004
INVENTOR(S) : Hideki Kojima

It is certified that error appears in the above-identified patent and that said Letters Patent is hereby corrected as shown below:

<u>Title page,</u>
Item [56], References Cited, OTHER PUBLICATIONS, "Nilesh V. Patel et al.," reference, change "Viedo" to -- Video --.
"Christoph Bregler et al.," reference, change "Acm" to -- ACM --.

Signed and Sealed this

Third Day of August, 2004

JON W. DUDAS
*Acting Director of the United States Patent and Trademark Office*